(12) United States Patent
Liu et al.

(10) Patent No.: US 11,555,610 B2
(45) Date of Patent: Jan. 17, 2023

(54) COMPREHENSIVE UTILIZATION SYSTEM FOR HIGH-TEMPERATURE GASIFICATION AND LOW-NITROGEN COMBUSTION OF BIOMASS

(71) Applicant: GUANGDONG UNIVERSITY OF TECHNOLOGY, Guangzhou (CN)

(72) Inventors: Xiaozhou Liu, Guangzhou (CN); Jin Huang, Guangzhou (CN); Junfei He, Guangzhou (CN); Zeqiong Xie, Guangzhou (CN); Fuqiang Gao, Guangzhou (CN); Wenjing Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 404 days.

(21) Appl. No.: 16/907,219

(22) Filed: Jun. 20, 2020

(65) Prior Publication Data
US 2021/0041099 A1 Feb. 11, 2021

(51) Int. Cl.
*F22B 31/04* (2006.01)
*F23G 5/027* (2006.01)
*F23G 5/44* (2006.01)
*F23G 5/46* (2006.01)
(Continued)

(52) U.S. Cl.
CPC ............ *F22B 31/045* (2013.01); *F23D 14/02* (2013.01); *F23D 14/66* (2013.01); *F23G 5/0276* (2013.01);
(Continued)

(58) Field of Classification Search
CPC ........ F22B 31/045; F23D 14/02; F23D 14/66; F23G 5/0276; F23G 5/442; F23G 5/46; F23G 2201/303; F23G 2201/40; F23G 2206/10; F23G 2207/10; F23G 2209/26; F23G 2900/00001
See application file for complete search history.

(56) References Cited

U.S. PATENT DOCUMENTS 4,291,636 A * 9/1981 Bergsten .................... C10J 3/74
110/238
4,341,167 A * 7/1982 St. John .................... F24F 3/06
110/235

(Continued)

FOREIGN PATENT DOCUMENTS

CN 105066111 A 11/2015
CN 108716670 A 10/2018

*Primary Examiner* — David J Laux

(57) ABSTRACT

A comprehensive utilization system for high-temperature gasification and low-nitrogen combustion of biomass comprises a gasifier, a boiler and a burner installed on the boiler. The outlet of the gasifier is connected to a fuel inlet of the burner. The boiler is provided with flue-gas exhaust ports connected to a chimney. Regenerative heat exchangers are provided between the flue-gas exhaust ports and the chimney, preheating air pipes are connected to the regenerative heat exchangers and then to an auxiliary mixing chamber. The auxiliary mixing chamber is provided with a first outlet connected to the inlet of the mixer, and a second outlet connected to the high-temperature air inlet of the gasifier and the second combustion-air inlet of the burner. An outlet of the mixer is connected with the first combustion-air inlet of the burner. The chimney is connected with the flue gas inlet of the gasifier through pipes and fans.

10 Claims, 3 Drawing Sheets

(51) Int. Cl.
 F23D 14/02 (2006.01)
 F23D 14/66 (2006.01)

(52) U.S. Cl.
 CPC ............... *F23G 5/442* (2013.01); *F23G 5/46* (2013.01); *F23G 2201/303* (2013.01); *F23G 2201/40* (2013.01); *F23G 2206/10* (2013.01); *F23G 2207/10* (2013.01); *F23G 2209/26* (2013.01); *F23G 2900/00001* (2013.01)

(56) References Cited

U.S. PATENT DOCUMENTS

| | | | | |
|---|---|---|---|---|
| 4,602,573 A | * | 7/1986 | Tanca | C10J 3/86 110/345 |
| 4,878,440 A | * | 11/1989 | Tratz | F23G 5/006 110/259 |
| 5,501,160 A | * | 3/1996 | Goldman | F23G 5/006 48/210 |
| 6,298,664 B1 | * | 10/2001 | .ANG.sen | E21B 43/164 60/671 |
| 6,485,296 B1 | * | 11/2002 | Bender | C10J 3/36 110/212 |
| 7,182,028 B1 | * | 2/2007 | White | F23J 15/02 110/255 |
| 8,632,615 B2 | | 1/2014 | Peng et al. | |
| 2003/0177963 A1 | * | 9/2003 | Maxwell | F23G 5/04 110/224 |
| 2004/0035339 A1 | * | 2/2004 | Kasin | F23G 5/24 110/345 |
| 2004/0238654 A1 | * | 12/2004 | Hagen | F23C 6/02 237/12.1 |
| 2006/0225424 A1 | * | 10/2006 | Elliott | F23G 5/444 60/722 |
| 2007/0284453 A1 | * | 12/2007 | Tsangaris | F23G 5/46 237/12 |
| 2012/0025141 A1 | | 2/2012 | Liping et al. | |
| 2012/0080647 A1 | | 4/2012 | Zhao et al. | |
| 2013/0067802 A1 | * | 3/2013 | Seidel | C10B 53/02 44/307 |
| 2013/0098750 A1 | * | 4/2013 | Nickerson | C02F 11/10 201/14 |
| 2013/0230815 A1 | * | 9/2013 | Ger | C10J 3/00 432/75 |
| 2016/0168471 A1 | * | 6/2016 | Endou | F23G 7/10 201/4 |
| 2016/0245508 A1 | * | 8/2016 | Massetti | C02F 11/06 |

* cited by examiner

COMPREHENSIVE UTILIZATION SYSTEM FOR HIGH-TEMPERATURE GASIFICATION AND LOW-NITROGEN COMBUSTION OF BIOMASS

CROSS-REFERENCE TO RELATED APPLICATIONS

This application claims priority to Chinese Patent Application No. 201910726761.8 with a filing date of Aug. 7, 2019. The content of the aforementioned applications, including any intervening amendments thereto, are incorporated herein by reference.

TECHNICAL FIELD

The present disclosure relates to the field of gasifiers and boiler systems of the biomass, in particular to a comprehensive utilization system for high-temperature gasification and low-nitrogen combustion of biomass.

BACKGROUND OF THE PRESENT INVENTION

The increasing shortage of fossil fuels has led to increasingly serious environmental problems. Bioenergy, as one of the alternative energy sources, has been paid increasing attention. Biomass energy has unique advantages, since it is renewable, low-pollution, extensive-distribution and abundant storage. The development and utilization of environmentally friendly, renewable and abundant clean energy resources such as biomass energy are the main strategic measures to solve the shortage of oil and coal, which can ensure the national energy security, protect the ecological environment, and improve the sustainable development capacity.

Bioenergy has high oxygen content, low sulfur content and low ash content, and it has low concentration of sulfur oxides and nitrogen oxides (NOx) after combustion. Although the nitrogen in biomass is less than that in coal, in terms of energy, the nitrogen in biomass is on the same magnitude as that in coal due to the low calorific value of biomass, and the NOx emissions from the biomass combustion products shouldn't be underestimated.

At present, there are two combustion methods of biomass fuel in heating systems, one is direct combustion with a biomass boiler, the other is post-gasification combustion. Due to the limitation of the body structure of the boiler, dust and NOx emissions in direct combustion will largely exceed standards and fail to meet environmental protection emission requirements. On the other hand, in the post-gasification combustion, the gasification rate is also low (generally below 60%) and the NOx emissions may seriously exceed standards, which need to be improved urgently. At present, in most popular combustion method, gasification is performed first and then transportation is followed, however problems still exist, the process is complicated, the investment is large, the gasification rate is low, and the NOx emissions seriously exceed standards.

SUMMARY OF PRESENT INVENTION

In order to overcome the shortcomings of the existing gasification technology described above, a comprehensive utilization system for high-temperature gasification and low-nitrogen combustion of biomass is provided in the disclosure, which can improve the gasification rate of the biomass and effectively reduce NOx emissions.

In order to achieve the above-mentioned object, a technical solution is provided in the present disclosure in the following. A comprehensive utilization system for high-temperature gasification and low-nitrogen combustion of biomass comprises a gasifier, a burner and a boiler, an outlet of the gasifier is connected to a fuel inlet of the burner through a pipe, and the burner is installed on the boiler. The boiler is provided with two flue-gas exhaust ports respectively connected to gas-side inlets of regenerative heat exchangers. Gas-side outlets of the regenerative heat exchangers are connected to a chimney through pipes, in order to discharge the flue gas through the chimney. Preheating air pipes are respectively connected to two air-side pipe joints of the regenerative heat exchangers and are then respectively connected to an auxiliary mixing chamber. The auxiliary mixing chamber is provided with a first outlet connected to a first inlet of a mixer, and the auxiliary mixing chamber is provided with a second outlet connected to a high-temperature air inlet of the gasifier and a second combustion-supporting air inlet of the burner. An outlet of the mixer is connected with a first combustion-supporting air inlet of the burner. The chimney is connected with a flue gas inlet of the gasifier and a second inlet of the mixer through pipes and fans.

Control valves are provided on the gas-side inlet pipes and the gas-side outlet pipes, of the regenerative heat exchangers.

Control valves are provided on air-side inlet pipes and air-side outlet pipes of the regenerative heat exchangers.

The regenerative heat exchanger comprises a shell and a heat storage medium disposed in the shell. The heat storage medium can absorb the heat of the high-temperature flue gas to heat the incoming low-temperature combustion-supporting air.

The heat storage medium is arranged in three layers in the shell, and the three layers are arranged in sequence from the gas-side inlet to the gas-side outlet, comprising a first layer filled with porous phase-change ceramic balls, a second layer filled with heat storage ceramic balls, and a third layer filled with heat storage cast-iron balls.

The porous phase-change ceramic ball comprises a porous ceramic shell and sodium sulfate encapsulated in the inner cavity of the shell. The average outer diameter of the porous phase-change ceramic ball is 30-50 mm, and the inner diameter of the inner cavity is 20 mm.

The height ratio of the first layer, the second layer, and the third layer in the space of the shell is 1:2:2.

The burner comprises an intake pipe, an outer combustion chamber, and an inner combustion chamber. The intake pipe is provided with a first opening connected to the outer combustion chamber, and a second opening communicated with the inner combustion chamber in tangential direction. The outer combustion chamber is disposed in a jacketed space outside the inner combustion chamber, and the end of the outer combustion chamber is communicated with the end of the inner combustion chamber.

A premixing cavity is provided between the outer combustion cavity and the first opening, an air distributor is provided between the premixing cavity and the outer combustion cavity, and the premixing cavity is in communication with the first opening. The air distributor is arranged to evenly distribute the biomass flue gas in the outer combustion cavity, so that the combustion is more uniform and the combustion efficiency is improved.

The air distributor may be a perforated plate.

Compared with the prior art, the present disclosure has the beneficial effects as follows. It can effectively save energy and increase the gasification rate of biomass fuel to 70-78%. It can make the combustion more sufficient and effectively reduce NOx emissions, actually the amount of NOx emissions can be controlled within 80-150 mg that is below the national standard.

DETAILED DESCRIPTION OF PREFERRED EMBODIMENTS

In the following, the technical solutions in the embodiments of the present disclosure will be clearly and completely described with reference to the drawings in the embodiments of the present disclosure. Obviously, the described embodiments are only part of, but not all of the embodiments of the present disclosure. Based on the embodiments of the present disclosure, any other embodiment obtained by those skilled in the art without creative efforts shall fall within the protection scope of the present disclosure.

Figure 1:
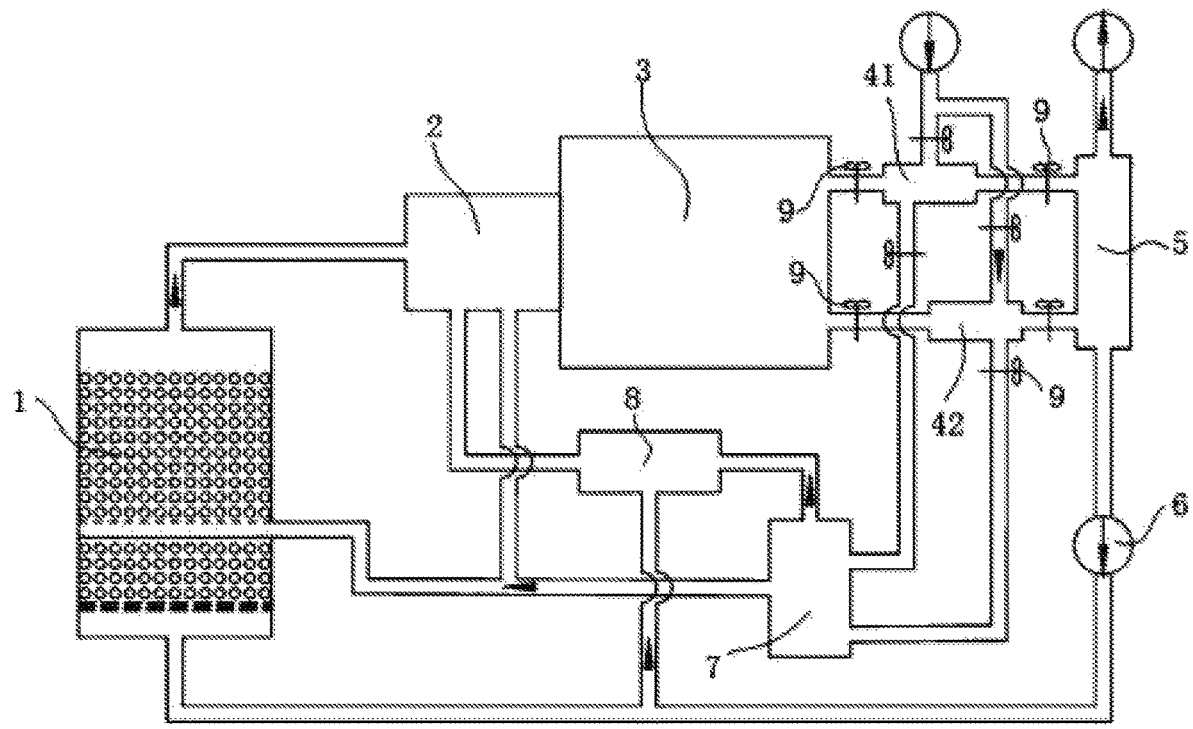
FIG. 1 is a schematic diagram of the structure of a comprehensive utilization system for high-temperature gasification and low-nitrogen combustion of biomass according to the present disclosure.

Referring to FIG. 1, a comprehensive utilization system for high-temperature gasification and low-nitrogen combustion of biomass comprises a gasifier 1, a burner 2, and a boiler 3. The outlet of the gasifier 1 is connected to the fuel inlet of the burner through a pipe, and the burner 2 is installed on the boiler 3. The boiler 3 is provided with two flue-gas exhaust ports respectively connected to gas-side inlets of regenerative heat exchangers (41,42). The gas-side outlets of the regenerative heat exchangers (41,42) are connected to a chimney 5 through pipes, in order to discharge the heat-exchanged flue gas through the chimney. Preheating air pipes are respectively connected to air-side pipe joints of the regenerative heat exchangers (41,42) and are then respectively connected to an auxiliary mixing chamber 7. Air heated by the regenerative heat exchangers (41,42) is collected in the auxiliary mixing chamber 7, in order to balance the temperature of the preheated air in two regenerative heat exchangers (41,42) and continuously supply hot air to the mixer 8 to ensure that the mixer 8 always has the amount of hot air. The auxiliary mixing chamber 7 may be a cavity for storing and cushioning the preheated air. The auxiliary mixing chamber 7 is provided with a first outlet connected to a first inlet of the mixer 8. The chimney 5 is provided with a bypass pipe connected to a second inlet of the mixer 8 through a fan 6, in order to introduce part of the flue gas into the mixer 8 to be mixed with the high-temperature combustion-supporting air. Preferably, the mixer 8 is a gas mixer. The outlet of the mixer 8 is connected with the first combustion-supporting air inlet 28 of the burner 2. The auxiliary mixing chamber 7 is provided with a second outlet connected to a high-temperature air inlet of the gasifier 1 and the second combustion-supporting air inlet 29 of the burner 2. The gasification temperature can be increased by using the high-temperature air for gasification, thereby increasing the combustion temperature of the biomass gasifier, which effectively improves the gasification efficiency. The chimney 5 is connected with a flue gas inlet of the gasifier 1 through a pipe and a fan 6. The waste heat of the flue gas is used to preheat the biomass in the gasifier 1, thereby effectively reducing the emission of nitrogen oxides.

Wherein, control valves 9 are provided on gas-side inlet pipes and gas-side outlet pipes of the regenerative heat exchangers (41, 42). Control valves 9 are provided on air-side inlet pipes and air-side outlet pipes of the regenerative heat exchangers (41,42). The flow direction of the flue gas or the hot combustion-supporting air can be controlled through the control valves. Preferably, the control valves 9 are electromagnetic valves.

Figure 4:
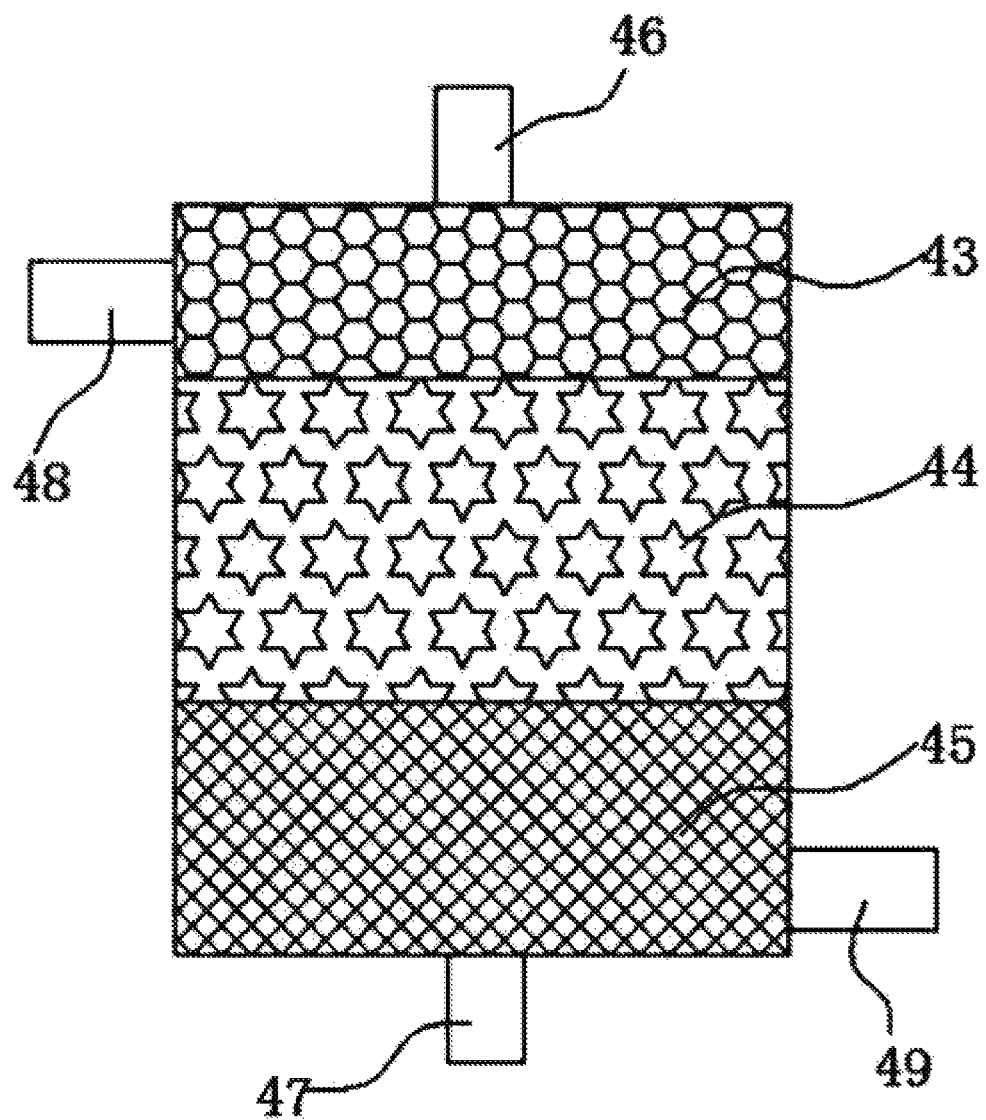
FIG. 4 is a sectional view of a regenerative heat exchanger in a comprehensive utilization system for high-temperature gasification and low-nitrogen combustion of biomass according to the present disclosure.

Referring to FIG. 4, the regenerative heat exchanger (41, 42) comprises a shell and a heat storage medium disposed in the shell. The shell is provided with a gas-side inlet 48, a gas-side outlet 49, an air-side inlet 47, and an air-side outlet 46. The heat storage medium can absorb the heat of the high-temperature flue gas to heat the incoming low-temperature combustion-supporting air. Wherein, the heat storage medium is arranged in layers in the shell, so as to improve the heat exchange efficiency. The heat storage medium is arranged in three layers in the shell, and the three layers are sequentially arranged from the gas-side inlet 48 to the gas-side outlet 49, comprising a first layer filled with porous phase-change ceramic balls, a second layer filled with heat storage ceramic balls, and a third layer filled with heat storage cast-iron balls. The first, layer of porous phase-change ceramic balls has good fire resistance, large heat capacity, and fast heat transferring speed. The waste heat of the flue gas can be stored in the phase-change medium in the ceramic ball that is used as a heat storage material, namely the waste heat of the high-temperature flue gas can be absorbed by the molten phase-change medium, and the heat can be released to heat the low-temperature combustion-supporting air through the solidification of the phase-change medium. The fuel gas, after first heat-exchange, can be further heat exchanged by the heat storage ceramic balls with small heat capacity and then the heat storage cast-iron balls with smaller heat capacity successively, so that the waste heat of the flue gas can be effectively absorbed and the heat exchange efficiency can be improved. The porous phase-change ceramic ball comprises a porous ceramic shell and sodium sulfate encapsulated in the inner cavity of the shell. Heat can be stored in the inner cavity of the shell through phase-change of sodium sulfate after it is absorbed by the sodium sulfate, and the heat capacity of the phase-change of sodium sulfate is very large. The average outer diameter of the porous phase-change ceramic ball is 30-50 mm, and the inner diameter of the inner cavity is about 20 mm. Wherein, the height ratio of the first layer, the second layer, and the third layer in the inner space of the shell is 1:2:2, which can maximize the heat exchange with the flue gas to absorb the waste heat of the flue gas, and also maximize the heat exchange with the air to heat the combustion-supporting air.

Figure 2:
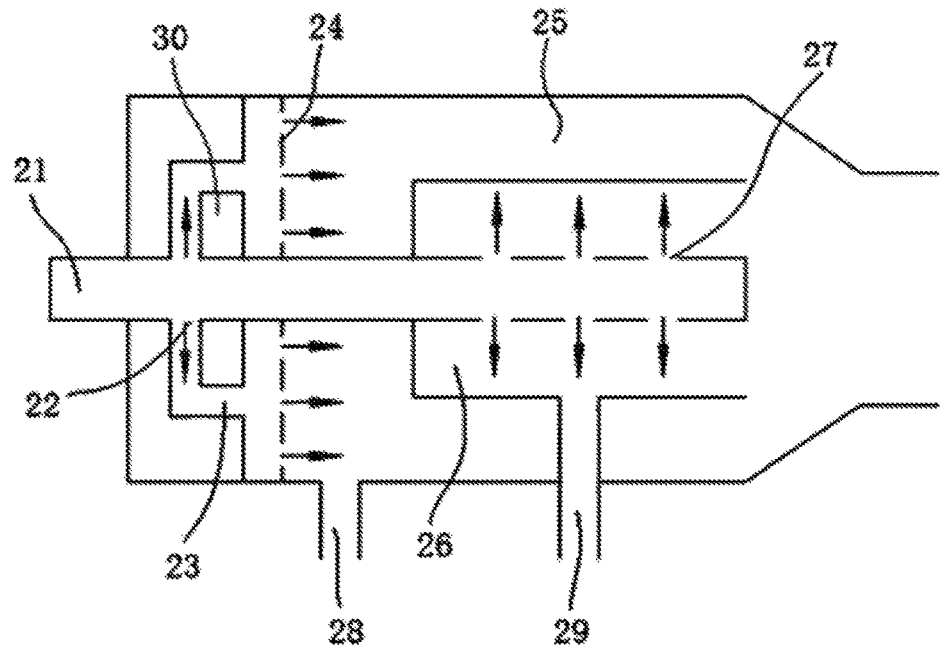
FIG. 2 is an axial sectional view of a burner in a comprehensive utilization system for high-temperature gasification and low-nitrogen combustion of biomass according to the present disclosure.
Figure 3:
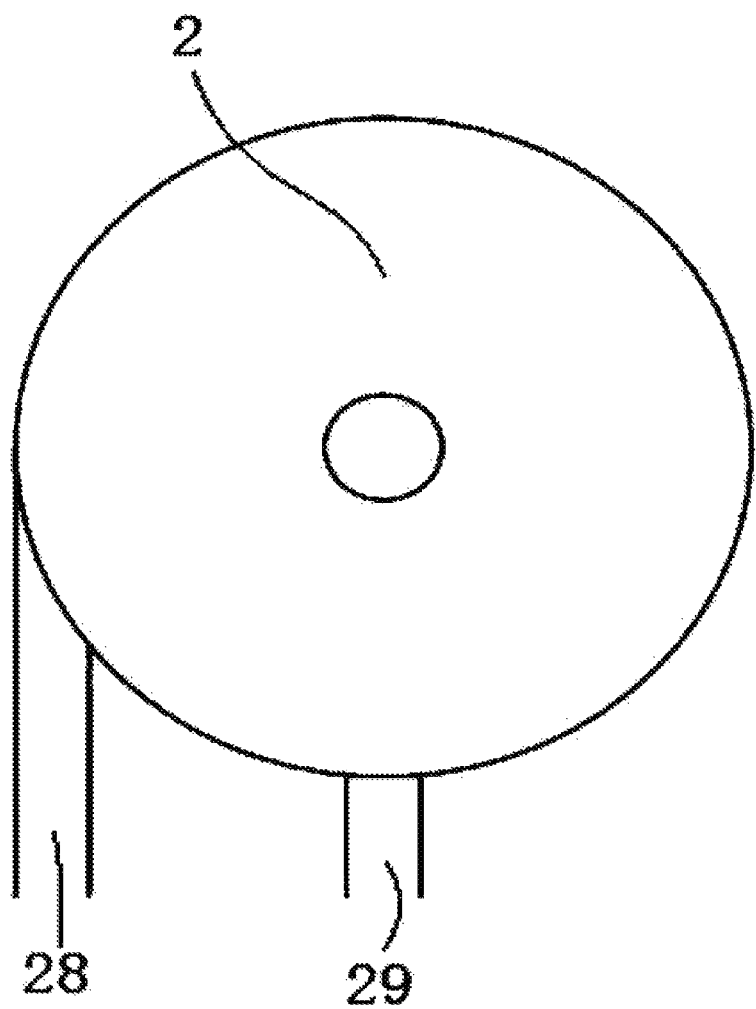
FIG. 3 is a left-side view of a burner in a comprehensive utilization system for high-temperature gasification and low-nitrogen combustion of biomass according to the present disclosure.

Referring to FIG. 2 and FIG. 3, the burner comprises an intake pipe 21, an outer combustion chamber 25, and an inner combustion chamber 26. The intake pipe 21 is provided with a first opening 22 connected to the outer combustion chamber 25, inputting part of the biomass gas into the combustion outer cavity 25 for combustion. The intake pipe 21 is provided with a second opening 27 communicated with the inner combustion cavity 26 in tangential direction, inputting the remaining biomass gas into the inner combustion cavity 26 for rotary combustion. The staged combustion can be performed to form double flame superposition to make the combustion more sufficiently, which can effectively improve the combustion efficiency and reduce NOx emissions. The outer combustion chamber 25 is disposed in a jacketed space formed between the inner combustion chamber 26 and the shell, and the end of the outer combustion chamber 25 is communicated with the end of the inner combustion chamber 26, so that the inner and outer combustion flames can be superimposed at the outlet to further improve the combustion efficiency. A premixing cavity 23 is provided between the outer combustion cavity 25 and the first opening 22, an air distributor 24 is provided between the premixing cavity 23 and the outer combustion cavity 25, and the premixing cavity 23 is in communication with the first opening 22. The biomass gas can be evenly distributed in the outer combustion cavity 25 through the air distributor 24, so that the combustion can be more uniform and the combustion efficiency can be improved. A guide block 30 is provided at the first opening 22 for guiding the biomass gas to be uniformly overflowed in the air distributor 24, in order to make the biomass gas distributed uniformly. Wherein, the air distributor 24 may be a perforated plate. The outer combustion cavity 25 is provided with a first combustion air inlet 28 that may be tangentially connected with the outer combustion cavity 25. The mixture of high-temperature air and flue gas is introduced by the first combustion air inlet 28, which can effectively improve the combustion efficiency. The inner combustion cavity 26 is provided with a second combustion air inlet 29 that is connected to the combustion cavity 26. The high-temperature air is introduced by the second combustion air inlet 29, which can effectively increase the combustion temperature to ensure the stable ignition of the biomass gas. At the same time, the flame of the inner combustion cavity 26 can be superimposed with that of the combustion outer cavity 25, effectively reducing the emission of nitrogen oxides.

In the present disclosure, two exhaust ports of the boiler are respectively connected to the air inlets of the regenerative heat exchangers (41,42), and the air outlets of the two regenerative heat exchangers (41,42) are connected to the chimney 5 to discharge the treated flue gas. During operation, when the flue gas discharged by the boiler enters the chimney 5 through the first regenerative heat exchanger 41, the combustion-supporting air enters the auxiliary mixing chamber 7 through the second regenerative heat exchanger 42. When the flue gas discharged by the boiler enters the chimney 5 through the second regenerative heat exchanger 42, the combustion-supporting air enters the auxiliary mixing chamber 7 through the first regenerative heat exchanger 41. Heat exchange is alternately performed by two regenerative heat exchangers (41, 42) to improve the heat exchange efficiency. The flue gas discharged by the boiler passes through the heat storage medium and enters the chimney 5 through the air outlet. The heat storage medium can be heated to 700° C.-800° C. when the high-temperature flue gas passes through the heat storage medium in the regenerative heat exchangers (41, 42). After a preset period, the switch can be controlled by the control valves 9, namely, the control valve 9 on the gas-side inlet pipe of the current one of the regenerative heat exchangers (41, 42) is closed while the control valve 9 on its air-side inlet pipe is open, and the control valve 9 on the gas-side inlet pipe of the other one of the regenerative heat exchangers (41,42) is open while the control valve 9 on its air-side inlet pipe is closed. The flue gas can be cooled to 100° C.-150° C. after its heat being absorbed by the heat storage medium in the regenerative heat exchangers (41,42) and then it is discharged into the chimney 5. The combustion-supporting air can be heated to 650° C.-750° C. by the heat-storage medium in the regenerative heat exchangers (41, 42), and then it enters the auxiliary mixing chamber 7. With the alternate emission of the flue gas, the waste heat of the combusted flue gas can be used to preheat the combustion-supporting air, which can effectively save energy and improve the treatment effect of flue gas.

The gasifier in the present disclosure has a gasification efficiency of more than 70%, the low calorific value of biomass gas is 4.48 MJ/Nm3, and the rate of biomass gas is 2.5 m³/kg, measured through a standard test method based on "Technical Conditions for Biomass Atmospheric Pressure Fixed-Bed Gasifier" numbered NY/T2907-2016, "Technical Specifications for Quality Evaluation of Straw Gasifier" numbered NY/T1417-2007 and "Experimental Rules of Industrial Boiler Thermal Performance" numbered GB/T10180-2017.

The flue gas emission of the comprehensive utilization system for high-temperature gasification and low-nitrogen combustion of biomass in the present disclosure is measured based on "Fixed Pollution Source Exhaust Gas—Measurement of Sulfur Dioxide—Constant Potential Electrolysis Method" numbered HJ57-2017, "Emission Standards of Atmospheric Pollutants from Boiler" numbered GB/13271-2047, "Sampling Methods for Particles and Gaseous Pollutants in Exhaust Gas from Fixed Pollution Sources" numbered GB/T16157-1996, "Experimental Rules for Thermal Performance of Industrial Boilers" numbered GB/T10180-2017, and "Test Methods for Smoke and Dust from Boiler" numbered GB/5468-1991. The results are as follows, the amount of nitrogen oxides are controlled within 80-150 mg/m³, the average value is 130 mg/m3, and the oxygen content is 5.1-5.4%.

The above are only the preferred embodiments of the present disclosure, but not the limitation of the scope of the present disclosure. Namely, any equivalent changes and modifications made according to the scope and description of the patent disclosure are still within the scope of the present disclosure.

We claim:

1. A comprehensive utilization system for high-temperature gasification and low-nitrogen combustion of biomass, wherein, it comprises a gasifier, a burner and a boiler, an outlet of the gasifier is connected to a fuel inlet of the burner through a pipe, and the burner is installed on the boiler, the boiler is provided with two flue-gas exhaust ports connected to a chimney through pipes; regenerative heat exchangers are respectively provided between the flue-gas exhaust ports and the chimney, preheating air pipes are respectively connected to the regenerative heat exchangers and are then respectively connected to an auxiliary mixing chamber, the auxiliary mixing chamber is provided with a first outlet connected to an inlet of a mixer, and the auxiliary mixing chamber is provided with a second outlet connected to a high-temperature air inlet of the gasifier and a second combustion-air inlet of the burner, an outlet of the mixer is connected with a first combustion-supporting air inlet of the burner; the chimney is connected with a flue gas inlet of the gasifier through pipes and fans.

2. The comprehensive utilization system for high-temperature gasification and low-nitrogen combustion of biomass according to claim 1, wherein control valves are provided on the gas-side inlet pipes and the gas-side outlet pipes of the regenerative heat exchangers.

3. The comprehensive utilization system for high-temperature gasification and low-nitrogen combustion of biomass according to claim 2, wherein control valves are provided on air-side inlet pipes and air-side outlet pipes of the regenerative heat exchangers.

4. The comprehensive utilization system for high-temperature gasification and low-nitrogen combustion of biomass according to claim 3, wherein the regenerative heat exchanger comprises a shell and a heat storage medium disposed in the shell.

5. The comprehensive utilization system for high-temperature gasification and low-nitrogen combustion of biomass according to claim 4, wherein the heat storage medium is arranged in three layers in the shell, and the three layers are arranged in sequence from the gas-side inlet to the gas-side outlet, comprising a first layer filled with porous phase-change ceramic balls, a second layer filled with heat storage ceramic balls, and a third layer filled with heat storage cast-iron balls.

6. The comprehensive utilization system for high-temperature gasification and low-nitrogen combustion of biomass according to claim 5, wherein the porous phase-change ceramic ball comprises a porous ceramic shell and sodium sulfate encapsulated in the inner cavity of the shell, the average outer diameter of the porous phase-change ceramic ball is 30-50 mm, and the inner diameter of the inner cavity is 20 mm.

7. The comprehensive utilization system for high-temperature gasification and low-nitrogen combustion of biomass, according to claim 6, wherein the height ratio of the first layer, the second, layer, and the third layer in the space of the shell is 1:2:2.

8. The comprehensive utilization system for high-temperature gasification and low-nitrogen combustion of biomass according to claim 3, wherein the burner comprises an intake pipe, an outer combustion chamber, and an inner combustion chamber, the intake pipe is provided with a first opening connected to the outer combustion chamber and a second opening communicated with the inner combustion chamber in tangential direction; the outer combustion chamber is disposed in a jacketed space outside the inner combustion chamber, and the end of the outer combustion chamber is communicated with the end of the inner combustion chamber.

9. The comprehensive utilization system for high-temperature gasification and low-nitrogen combustion of biomass according to claim 8, wherein a premixing cavity is provided between the outer combustion cavity and the first opening, an air distributor is provided between the premixing cavity and the outer combustion cavity, and the premixing cavity is in communication with the first opening; the air distributor is arranged to evenly distribute the biomass gas in the outer combustion cavity.

10. The comprehensive utilization system for high-temperature gasification and low-nitrogen combustion of biomass according to claim 9, wherein the air distributor is a perforated plate.

* * * * *